United States Patent
Fosse et al.

(10) Patent No.: US 9,152,598 B2
(45) Date of Patent: Oct. 6, 2015

(54) CONNECTING MULTIPLE SLAVE DEVICES TO A SINGLE MASTER CONTROLLER IN BUS SYSTEM

(71) Applicant: Atmel Corporation, San Jose, CA (US)

(72) Inventors: Francois Fosse, Nantes (FR); Laurent Le Goffic, Nantes (FR)

(73) Assignee: Atmel Corporation, San Jose, CA (US)

( * ) Notice: Subject to any disclaimer, the term of this patent is extended or adjusted under 35 U.S.C. 154(b) by 216 days.

(21) Appl. No.: 13/687,044

(22) Filed: Nov. 28, 2012

(65) Prior Publication Data

US 2014/0149615 A1    May 29, 2014

(51) Int. Cl.
G06F 13/00    (2006.01)
G06F 13/42    (2006.01)
G06F 13/364    (2006.01)

(52) U.S. Cl.
CPC .......... *G06F 13/4291* (2013.01); *G06F 13/364* (2013.01)

(58) Field of Classification Search
USPC ................................. 710/104–110, 305–317
See application file for complete search history.

(56) References Cited

U.S. PATENT DOCUMENTS

| | | | |
|---|---|---|---|
| 5,461,723 A | 10/1995 | Shah et al. | |
| 5,828,852 A * | 10/1998 | Niedermeier et al. | 710/110 |
| 6,141,741 A | 10/2000 | Priem et al. | |
| 6,664,821 B2 | 12/2003 | De Haas et al. | |
| 6,970,961 B1 | 11/2005 | Heitkamp et al. | |
| 7,106,094 B2 | 9/2006 | Gamble et al. | |
| 7,174,403 B2 | 2/2007 | Ganasan | |
| 7,219,174 B2 * | 5/2007 | Gerlach et al. | 710/65 |
| 7,426,709 B1 | 9/2008 | Ganesan | |
| 7,725,626 B2 * | 5/2010 | Chen et al. | 710/62 |
| 8,082,381 B2 * | 12/2011 | Reddy et al. | 710/316 |
| 8,832,343 B2 * | 9/2014 | Decesaris et al. | 710/110 |
| 2004/0236888 A1 | 11/2004 | Dieffenderfer et al. | |
| 2007/0043890 A1 * | 2/2007 | Miller | 710/68 |
| 2008/0046619 A1 * | 2/2008 | Miller | 710/110 |
| 2008/0162747 A1 * | 7/2008 | Chen et al. | 710/51 |

(Continued)

FOREIGN PATENT DOCUMENTS

WO    WO 2006091843    8/2006

OTHER PUBLICATIONS

UM10204 I²C-bus specification and user manual, Rev. Oct. 5-9, 2012 (64 pages).

(Continued)

*Primary Examiner* — Raymond Phan
(74) *Attorney, Agent, or Firm* — Fish & Richardson P.C.

(57) ABSTRACT

A device comprising: a bus master, including a bi-directional data and clock lines, configured to produce a select signal output for enabling data transmission on the bi-directional data line to first/second different data busses supporting multiple slave devices configured to receive/transmit data over a respective data bus and to receive a clock signal from the bus master from the clock line; and a de-multiplexer including an input, first and second outputs and a control input, the input coupled to the bi-directional data line of the bus master, first/second outputs of the de-multiplexer coupled to first/second data busses, respectively, and the control input configured to receive the select signal from the bus master that is configured to communicate to a first slave device when the select signal is in a first state, and a second different slave device when the select signal is in a second different state.

12 Claims, 5 Drawing Sheets

(56) References Cited

U.S. PATENT DOCUMENTS

| | | | |
|---|---|---|---|
| 2010/0057974 A1* | 3/2010 | Reddy et al. | 710/316 |
| 2012/0144078 A1 | 6/2012 | Poulsen | |
| 2014/0082249 A1* | 3/2014 | Pan et al. | 710/308 |
| 2014/0101351 A1* | 4/2014 | Hooper et al. | 710/110 |

OTHER PUBLICATIONS

Features, Atmel 32-bit Atmel AVR Microcontroller Summary AT32UC3L064, AT32UC3L032, AT32UC3L016, 2012, (113 pages).

Atmel AVR32025: AT32UC3L-EK User Guide, Atmel 32-bit Atmel Microcontrollers Application note, 2012 (36 pages).

Atmel AVR32844: UC3L Schematic Checklist, Amel 8-bit Atmel Microcontrollers Application Note, 2011, (26 pages).

Atmel AVR154: Software Emulation of TWI Slave Hardware Module, Atmel 8-bit Atmel Microcontrollers, Application Note, 2012, (4 pages).

74HC4051; 74HCT4051, 8-channel analog multiplexer/demultiplexer, Product Data Sheet, Jul. 2012 (31 pages).

Features, Atmel 32-bit Atmel AVR Microcontroller, AT32UC3L0256, AT32UC3L0128, Jun. 2013, (852 pages).

* cited by examiner

CONNECTING MULTIPLE SLAVE DEVICES TO A SINGLE MASTER CONTROLLER IN BUS SYSTEM

BACKGROUND

This specification relates to electronic communication.

Electronic devices can communicate in accordance with a communication protocol over a communication medium. Some communication protocols require that a given device be addressed, and communications from and to the given device can include the address. Different addresses can be used to disambiguate one component from another.

SUMMARY

In general, one innovative aspect of the subject matter described in this specification can be implemented in a device that comprises: a bus master including a bi-directional data line and clock line and being configured to produce a select signal output for enabling data transmission on the bi-directional data line to first and second different data busses that support one or more slave devices, each slave device configured to receive/transmit data over a respective data bus and to receive a clock signal from the bus master from the clock line; and a de-multiplexer including an input and first and second outputs and a control input, the input being coupled to the bi-directional data line of the bus master, a first output of the de-multiplexer being coupled to the first data bus and a second output of the de-multiplexer being coupled to the second data bus. The control input is configured to receive the select signal from the bus master. The bus master is configured to communicate to a first slave device coupled to the first data bus when the select signal is in a first state, and to communicate to a second different slave device coupled to the second data bus when the select signal is in a second different state.

These and other implementations can each optionally include one or more of the following features. The bus master can be an I2C master and the slave devices can be I2C slaves. The bus master and the de-multiplexer can be incorporated in a microcontroller. The device can further include logic for coupling the bus master and de-multiplexer. The select signal can be provided on a general input/output port of the microcontroller. The slave devices can have a same address. The de-multiplexer can be a 1-2 de-multiplexer. The de-multiplexer can be a 1-$2^N$ de-multiplexer where N is an integer, and each output of the de-multiplexer can be coupled to a data bus that in turn is coupled to one or more slave devices. The device can further comprise a second de-multiplexer including an input and first and second outputs and a control input, the input being coupled to the bi-directional clock line of the bus master, a first output of the second de-multiplexer being coupled to a first clock bus and a second output of the second de-multiplexer being coupled to a second clock bus. The first and second clock busses can be coupled to one or more slave devices associated with the first and second data busses respectively, and the control input can be configured to receive the select signal from the bus master.

In general, another innovative aspect of the subject matter described in this specification can be implemented in a master device for communicating with two or more different slave devices over a single bus, the single bus including a data bus and a clock bus, the improvement comprising: coupling the data bus from the master device to an input of a de-multiplexer and respective outputs of the de-multiplexer to different slave devices using different data busses; and configuring the master device to control the de-multiplexer to select one of the different data busses associated with a respective one of the different slave devices depending upon which slave device is desired to be communicated with.

In general, another innovative aspect of the subject matter described in this specification can be implemented in a microcontroller. The microcontroller includes a master device including a data line and a clock line and being configured to produce a select signal output for enabling data transmission on the data line to first and second different data busses of the microcontroller that support one or more slave devices, each slave device configured to receive/transmit data over a respective data bus and to receive a clock signal from the master controller from the clock line. The microcontroller further includes a de-multiplexer including an input and first and second outputs and a control input, the input being coupled to an output of the data line of the master device, a first output of the de-multiplexer being coupled to the first data bus and a second output of the de-multiplexer being coupled to the second data bus. The control input is configured to receive the select signal from the master device. The microcontroller further includes logic coupling the master device, the de-multiplexer and output pads of the microcontroller that correspond to the first and second data busses. The master device is configured to communicate to a first slave device coupled to the first data bus when the select signal is in a first state, and to communicate to a second different slave device coupled to the second data bus when the select signal is in a second different state.

These and other implementations can each optionally include one or more of the following features. Logic in the microcontroller can include a first buffer coupling a first output of the de-multiplexer to a first pad associated with the first data bus of the microcontroller. Logic in the microcontroller can include a second buffer coupling a second output of the de-multiplexer to a second pad associated with the second data bus of the microcontroller, and an AND gate having first and second inputs and an output coupled to an input of the data line of the master device. Logic in the microcontroller can include a third buffer coupling the first pad of the microcontroller to the first input of the AND gate. Logic in the microcontroller can include a fourth buffer coupling the second pad of the microcontroller to the second input of the AND gate.

In general, another innovative aspect of the subject matter described in this specification can be implemented in a method comprising: providing a data bus from a master device to an input of a de-multiplexer and respective outputs of the de-multiplexer to different slave devices using different data busses; and configuring the master device to control the de-multiplexer to select one of the different data busses associated with a respective one of the different slave devices depending upon which slave device is desired to be communicated with.

Particular embodiments of the subject matter described in this specification can be implemented so as to realize none, one or more of the following advantages. Multiple I2C devices can be coupled to a single master device in a communication network, even where two or more of the devices share the same address. Methods and apparatus are proposed to enable two slave devices that share a common address to communicate with a single master, such as by using multiple busses, one for each of the slave devices. By utilizing a multi-bus configuration, bus loading and limitations regarding the same address can be minimized.

Utilizing a multi-bus configuration can enable a reduction in the strength of the clock signal and/or data signal pull-up resistors (e.g., data signal only when the clock signal is common) required and can therefore reduce the power needed for communication. As an example, moving from 2.2 kiloohms to 4.7 kiloohms for the pull-up resistors can reduce the power loss of the clock signal by more than 2. When multiple devices are being distributed on two different busses, pull-up resistors can be weaker since capacitive load of each bus is reduced; and the same bus speed can be achieved.

Further, a multi-bus architecture does not require designers to duplicate software (e.g., to enable handling another master), or use software emulation (e.g., bit-banging of the master). This can save development time when writing the firmware for an application, and memory space, e.g., through use of mutually shared software code.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
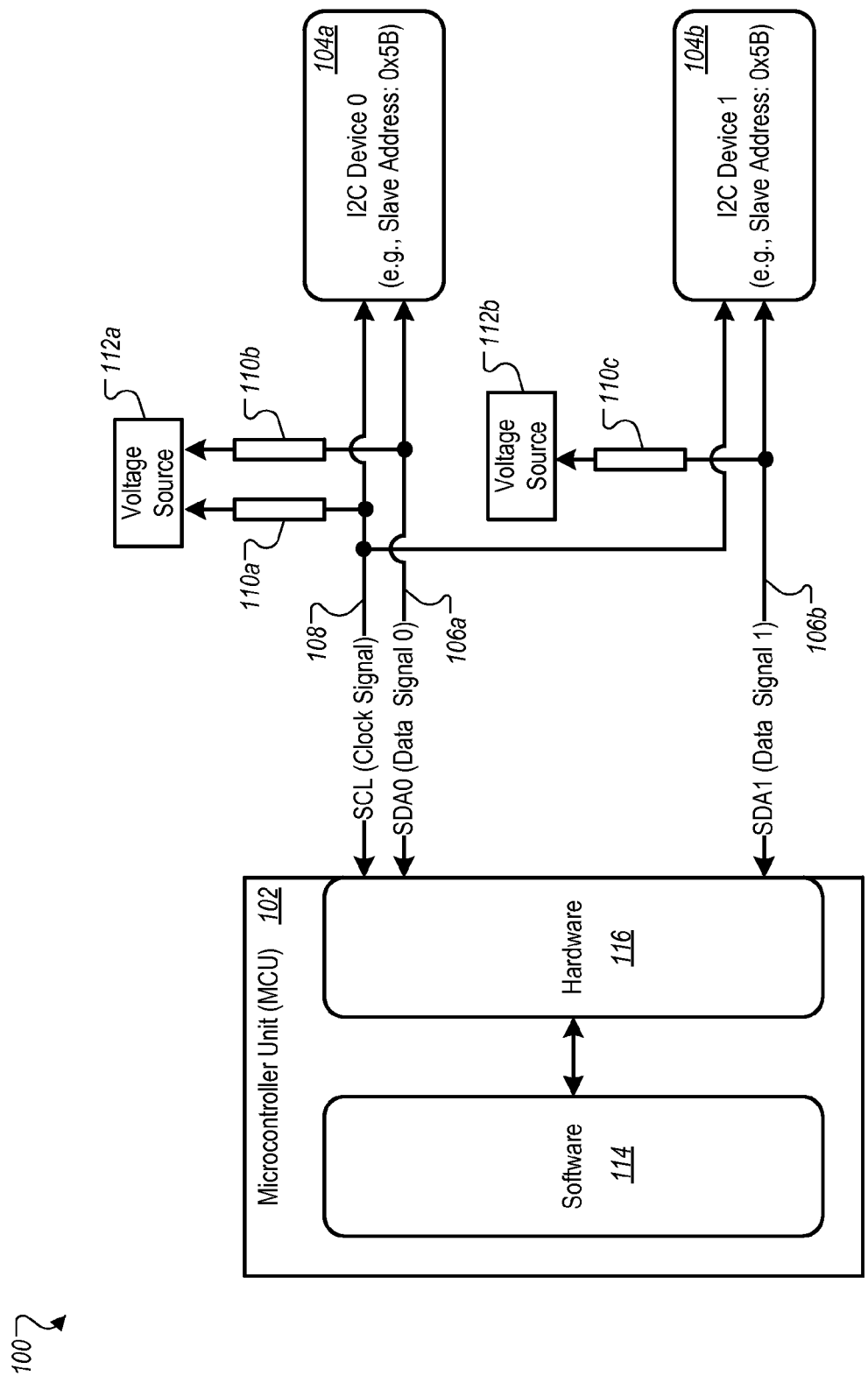
FIG. 1 is a diagram of an example microcontroller for communicating with two different slave devices.

FIG. 1 is a diagram of an example microcontroller 100 for communicating with two different slave devices 104a and 104b. In the present example, the slave devices 104a-104b can be inter-integrated circuit (I2C) slave devices (or some other two-wire interface slave devices) having the same slave address. The slave devices 104a-104b may have been assigned the same address at or coincident to a time of manufacture, as might be the case when the devices are configured prior to delivery to a customer. The slave devices 104a-104b can be produced by a same manufacturer, or different manufacturers. While reference is made to two slave devices 104a-104b, more than two can be included in the environment. Two devices have been shown for clarity purposes only.

Microcontroller 100 includes a microcontroller unit (MCU) 102 that includes software components 114 and hardware components 116. The MCU 102 can include first and second data lines and a clock line. Slave device 104a, for example, can be coupled to the first data line of the MCU 102, over which a data signal 0 106a is received. Slave device 104a can be further coupled to the clock line of the MCU 102, over which a clock signal 108 is received. Similarly, slave device 104b can be coupled to the second data line of the MCU 102 (e.g., over which a data signal 1 106b is received) and to the clock line of the MCU 102 (e.g., over which clock signal 108 is received).

The configuration of components of the microcontroller 100, for example, enables data transmission to each of the two different slave devices 104a and 104b, even when the two slave devices have the same slave address. For example, software components 114 and hardware components 116 can control signals that are sent across the data signals lines 106a-106b and the clock signal 108 so that communication can occur with an appropriate slave device and at an appropriate time.

In some implementations, clock signal line 108 and data signal lines 106a and 106b are coupled to resistors 110a-110c (e.g., pull-up resistors), which are in turn coupled to voltage sources 112a-112b. Other components and configurations can be used to create hard high or hard low signals on the data and clock signal lines as required for a given communication protocol.

Figure 2:
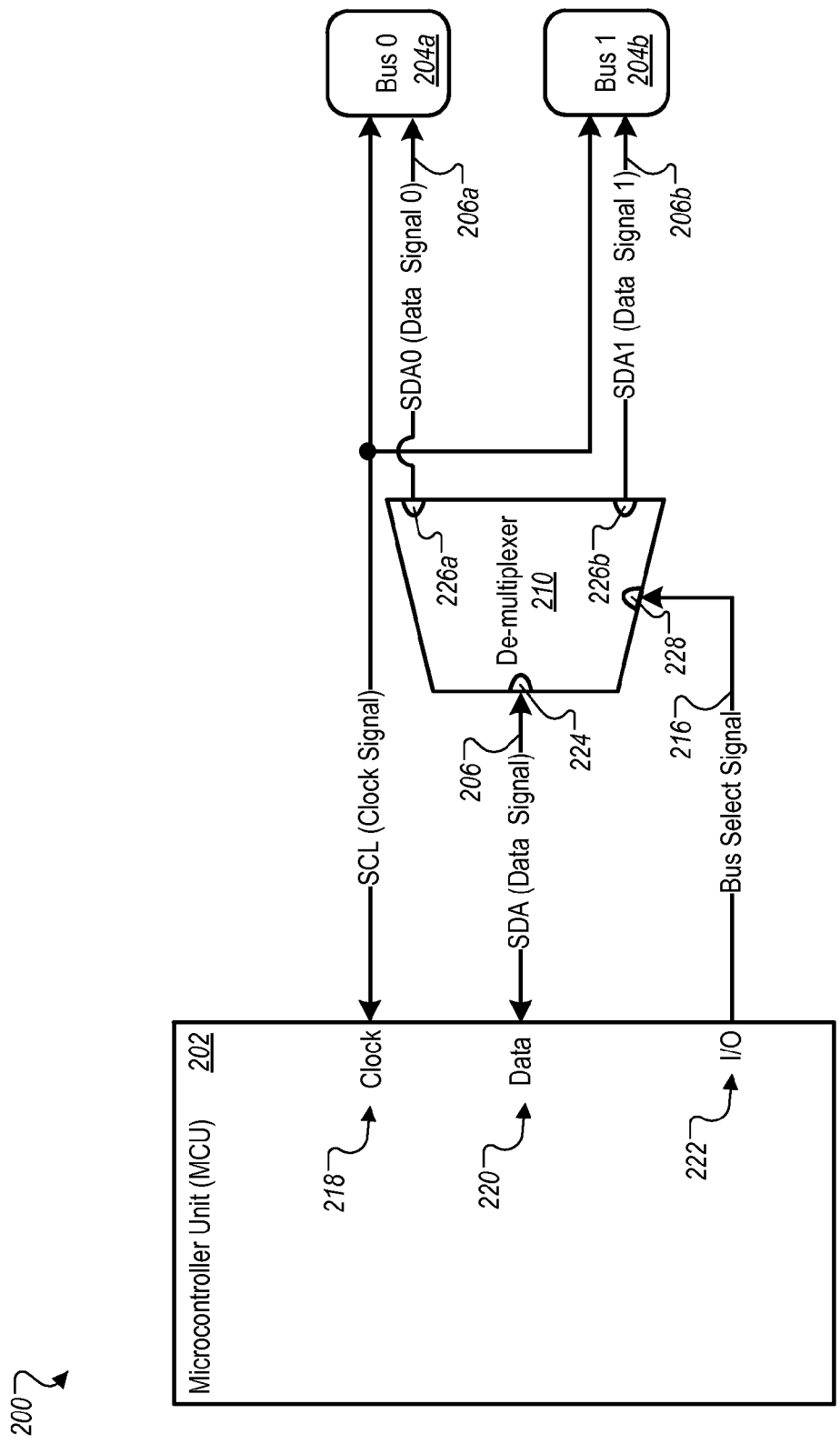
FIG. 2 is a diagram of an example microcontroller for communicating along two different data busses.

FIG. 2 is a diagram of an example microcontroller 200 for communicating along two different data busses. For example, the microcontroller 200 can allow communication with two slave devices having the same address.

The microcontroller 200 includes a microcontroller unit (MCU) 202 that is configured to act as a master device (e.g., an I2C bus master). The MCU 202 includes a data line 220, a clock line 218, and a select signal output 222. MCU 202 is configured to enable data transmission on the data line 220 to first and second different data busses 204a and 204b. For example, data busses 204a and 204b of the microcontroller 200 can support one or more slave devices (e.g., I2C slave devices). Each of the data busses 204a and 204b is configured to receive/transmit data over a respective data bus. Clock line 218 of the MCU 202 is used to transmit a clock signal to each of the respective slave devices. In some implementations, the select signal output 222 can be a general input/output port of the MCU 202. The MCU 202 can produce a select signal and provide it on select signal output 222 to control selection of one of a plurality of data buses coupled to the MCU 202. The control of the data buses enables plural different slave devices to be coupled to the MCU 202 (one on each bus) even where the slave devices have a common address.

The microcontroller 200 further includes a de-multiplexer 210 having an input 224, first and second outputs 226a-226b, and a control input 228. The input 224 is coupled to the output of the data line 220 of the MCU 202. The first output 226a of the de-multiplexer 210 is coupled to the first data bus 204a, e.g., carrying data signal 0 (SDA0) 206a. The second output 226b of the de-multiplexer 210 is coupled to the second data bus 204b, e.g., carrying data signal 1 (SDA1) 206b. The control input 228 is configured to receive the select signal 216 from the MCU 202 via the select signal output 222.

In some implementations, buffers can be used to couple the MCU 202, the de-multiplexer 210 and output pads of the microcontroller that correspond to the first and second data busses (e.g., busses 204a and 204b). The MCU 202 can communicate with a first slave device coupled to the first data bus (e.g., data bus 204a) when the select signal 216 is in a first state. When the select signal 216 is in a second different state, the MCU 202 is configured to communicate to a second different slave device coupled to the second data bus (e.g., data bus 204b).

Figure 3:
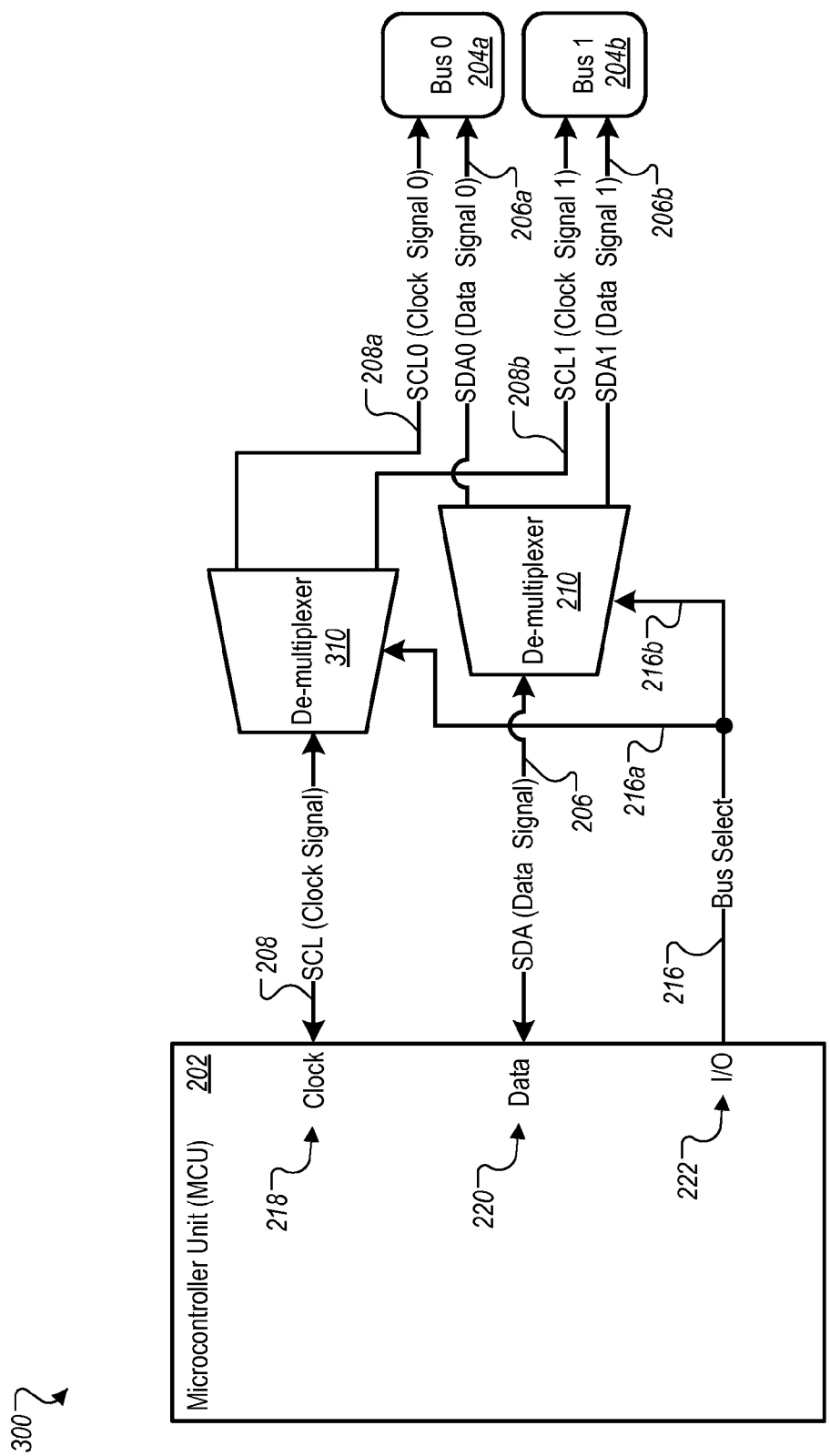
FIG. 3 is a diagram of an example microcontroller for communicating along two different data and clock busses.

FIG. 3 is a diagram of an example microcontroller 300 for communicating along two different data and clock busses. The microcontroller 300 is similar to the microcontroller 200 described with reference to FIG. 2, except that the microcontroller 300 includes a de-multiplexer 310 for creating two separate clock signals. The de-multiplexer 310 receives the same bus select signal 216 that is received by the de-multiplexer 210. As a result, the de-multiplexer 310 produces SCL0 clock signal 0 208a when the select signal 216 is in a first state. The SCL0 clock signal 0 208a is received by bus 0

204a. When the select signal 216 is in a second different state, the de-multiplexer 310 produces SCL1 clock signal 1 208b. The SCL1 clock signal 1 208b is received by bus 1 204b.

Figure 4:
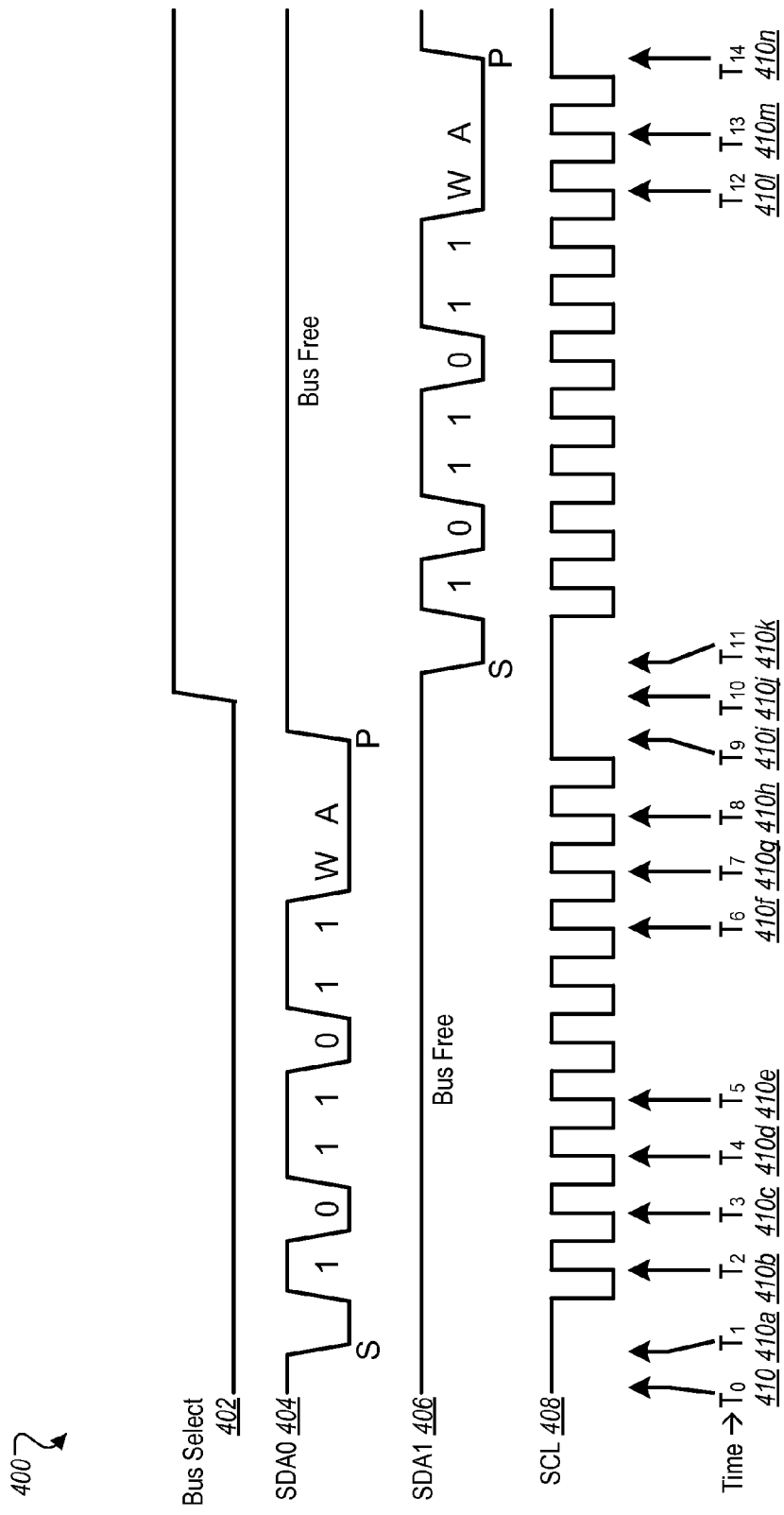
FIG. 4 is a diagram of an example signal timeline for controlling data transmission to two slave devices each coupled to respective buses using a clock and a bus select signal.

FIG. 4 is a diagram of an example signal timeline 400 for controlling data transmission to two slave devices each coupled to respective buses using a clock and a bus select signal. For example, the signal timeline 400 shows a data exchange on bus 0 204a and bus 1 204b between the MCU and two slave devices which may have the same slave address (e.g., a 7-bit address of 0x5B). As such, the signal timeline 400 represents an example set of signals that can occur using the microcontroller system 200 described with respect to FIG. 2. For example, the signal timeline 400 includes a bus select signal 402 that can correspond to signals that occur on the bus select line 216. SDA0 signal line 404 and SDA1 signal line 406 can correspond, for example, to signals on the SDA0 line 206a and SDA1 line 206b, respectively. SCL signal line 408 can correspond, for example, to clock signals described above.

Times $T_0$ 410 through $T_{14}$ 410a are example times in the signal timeline 400 at which certain events occur, e.g., corresponding to transmission of data to/from slave devices 0 and 1. For example, at time $T_1$ 410a, bus select signal 402 is set low, and SDA0 signal line 404, SDA1 signal line 406 and SCL signal line 408 are set high.

At time $T_1$ 410a, a start ("S") high-to-low signal is sent on the SDA0 signal line 404 (e.g., sent to slave device 0), signaling that data transmission is commencing. The signal is received by the first slave device (slave device 0) that is coupled to the SDA0 signal line, for example, because the bus select line 402 is low, a state in which data can be received on the SDA0 signal line 404. Thereafter, MCU 202 can produce the clock signal, e.g., a clock generator associated with the MCU 202 can begin to send alternating high and low signals on the SCL signal line 408. As such, sampling of data on the SDA0 signal line 404 can begin.

At time $T_2$ 410b, on an upward, low-to-high edge of the clock signal, a "1" value can be read from the SDA0 signal line 404. In the example, shown, a single data rate protocol is used. Other rates can be used, including a double data rate in which sampling occurs on both the rising and falling edges of the clock cycle.

At times $T_3$ 410c, $T_4$ 410d and $T_5$ 410e, the next data values (e.g., values "0", "1" and "1") can be read from the SDA0 signal line 404. Additional data values can be read, finishing with the final value (e.g., a "1" value) that is read from the SDA0 signal line 404 at time $T_6$ 410f. This completes the data transfer to the first slave device (slave device 0) that is coupled to the first data bus (e.g., as represented by the SDA0 signal line 404 in this sequence).

At time $T_7$ 410g, a write ("W") signal is generated, followed by an acknowledgement ("A") signal at time $T_8$ 410h. At time $T_9$ 410i, a stop ("P") signal is generated. As data transmission has ended, the clock generator can stop sending clock signals over the SCL signal line 408 (as shown in the break in the clock signal generation at times $T_9$-$T_{11}$. The signaling protocol described is an example of a signaling protocol that can be used to communicate, such as between a master and a slave device that is coupled as shown with reference to FIGS. 2 and 3. Other protocols can be used.

At approximately time $T_{10}$ 410j, the MCU 202 can cause the bus select signal 402 to transition from low to high, enabling communication to the second slave device (slave device 1) that is coupled to the second data bus. After the transition, communication using SDA0 signal line 404 is disabled, and communication using SDA1 signal line 406 is enabled. At time $T_{11}$ 410k, a start ("S") high-to-low signal can be provided on the SDA1 signal line 406 (e.g., sent by MCU 202 to slave device 1), signaling that data transmission is to commence. The clock generator in the MCU 202 can resume sending clock signals, enabling data to be read from bus 1 over the SDA1 signal line 406.

At time $T_{12}$ 410l, a write ("W") signal is generated (e.g., meaning that the master wants to write to the slave), followed by an acknowledgement at time $T_{13}$ 410m. At time $T_{14}$ 410n, a stop ("P") signal is generated (by MCU 202) signaling a release of the respective bus. Thereafter, the clock generator stops sending clock signals over the SCL signal line 408. Pursuant to the write signal at time $T_{12}$ 410l, no data is written since the communication is stopped at that time. This kind of frame can be used, for example, to probe a component on the bus, e.g., "if ACK, then the device is present; if NACK, then the device is not present."

Figure 5:
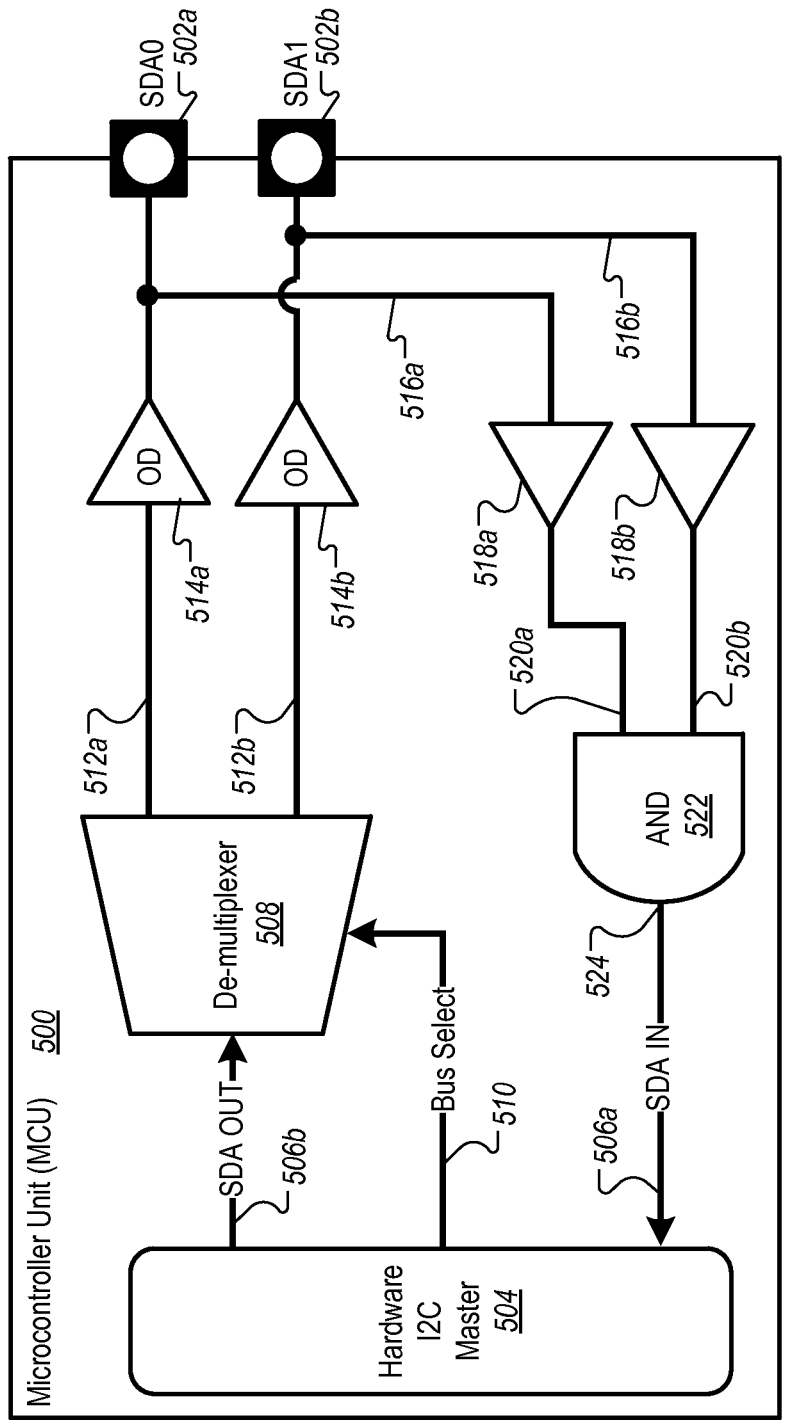
FIG. 5 is a schematic of an example microcontroller using a de-multiplexer, logic and buffers for communication with plural slave devices.

FIG. 5 is a schematic of an example microcontroller 500 using a de-multiplexer, logic (e.g., an AND gate) and buffers for communication with plural slave devices. For example, pads 502a and 502b can be connected to different slave devices (e.g., I2C slave devices). The logic in the microcontroller 500 makes it possible for a master device 504 to interface with different slave devices even if they have the same address. While two pads 502a and 502b are shown in this example of the microcontroller 500, other configurations can allow for more pads (e.g., four, eight, sixteen, etc.), enabling the microcontroller 500 to control a corresponding number of slave devices, even where those slave devices have a common address.

As depicted, the microcontroller 500 is an example in which a bus master (e.g., master device 504) and a de-multiplexer (e.g., the de-multiplexer 508) are incorporated in a single device. For example, some or all of the components of the microcontroller 500 can be contained in silicon, e.g., rather than having some components external to the master device 504. In some implementations, the components can be included in the bus master, or included in silicon with the bus master.

In some implementations, the microcontroller 500 includes plural buffers. For example, a first buffer 514a couples a first output 512a of a de-multiplexer 508 (e.g., a 1-2 de-multiplexer) to the first pad 502a associated with the first data bus of the microcontroller. A second buffer 514b couples a second output 512b of the de-multiplexer 508 to a second pad 502b associated with the second data bus of the microcontroller.

In the configuration shown, logic (e.g., AND gate 520 having first and second inputs 520a and 520b and an output 524) has inputs coupled to the first and second pads 502a and 502b, respectively, through third and fourth buffers 518a and 518b, respectively. The output of the AND gate 520 is coupled to an input 506a of the master device 504. An output 506b of the master device 504 is coupled to the de-multiplexer 508.

In some implementations, the de-multiplexer 508 can be a 1-$2^N$ de-multiplexer (where N is an integer), and each output of the de-multiplexer 508 can be coupled to a data bus that in turn is coupled to one or more slave devices. For example, if N is 2, then de-multiplexer 508 can be a 1-4 de-multiplexer. In some implementations, the logic of the microcontroller 500 can be modified to replace the two-input AND gate 522 with an AND gate having the same number of $2^N$ inputs (or with plural gates). The number of buffers, in addition to buffers 514a, 514b, 518a and 518b, would also increase proportionally.

While reference is made above to communications flowing from the MCU to the slave devices, transmission from the slave devices to the MCU is also contemplated. The example communication sequence was used to highlight the protocol required to successfully communicate with the two different slave devices using the configurations shown. Other sequences are possible. Similarly, the example communication protocol described is associated with I2C devices and includes start and stop signals and a read/write bit. The configurations shown enable plural I2C slave devices to communicate with a single master device. Other communication protocols can be used. While reference is made to slave devices being assigned a same address, this is not strictly required. For example the multiple bus architecture can be used even where slave devices do not have a common address. Such a multiple-bus architecture can be used to minimize bus loading, such as when many slave devices are included in a given implementation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A device comprising:
   a bus master including a bi-directional data line and clock line and being configured to produce a select signal output for enabling data transmission on the bi-directional data line to first and second different data buses that support one or more slave devices, each slave device configured to receive/transmit data over a respective data bus and to receive a clock signal from the bus master from the clock line; and
   a de-multiplexer including an input and first and second outputs and a control input, the input being coupled to the bi-directional data line of the bus master, a first output of the de-multiplexer being coupled to the first data bus and a second output of the de-multiplexer being coupled to the second data bus, wherein the control input is configured to receive the select signal from the bus master;
   wherein the bus master is configured to communicate to a first slave device coupled to the first data bus when the select signal is in a first state, and to communicate to a second different slave device coupled to the second data bus when the select signal is in a second different state.

2. The device of claim 1 wherein the bus master is an I2C master and the slave devices are I2C slaves.

3. The device of claim 1 wherein the bus master and the de-multiplexer are incorporated in a microcontroller.

4. The device of claim 1 wherein the select signal is provided on a general input/output port of the microcontroller.

5. The device of claim 1 wherein the slave devices have a same address.

6. The device of claim 1 wherein the de-multiplexer is a 1-2 de-multiplexer.

7. The device of claim 1 wherein the de-multiplexer is a $1\text{-}2^N$ de-multiplexer where N is an integer and wherein each output of the de-multiplexer is coupled to a data bus that in turn is coupled to one or more slave devices.

8. The device of claim 1 further comprising a second de-multiplexer including an input and first and second outputs and a control input, the input being coupled to the bi-directional clock line of the bus master, a first output of the second de-multiplexer being coupled to a first clock bus and a second output of the second de-multiplexer being coupled to a second clock bus, wherein the first and second clock buses are coupled to one or more slave devices associated with the first and second data buses respectively, and wherein the control input is configured to receive the select signal from the bus master.

9. The device of claim 3 further including logic for coupling the bus master and de-multiplexer.

10. A master device for communicating with two or more different slave devices over a single bus, the single bus including a data bus and a clock bus, an improvement comprising:
    coupling the data bus from the master device to an input of a de-multiplexer and respective outputs of the de-multiplexer to different slave devices using different data buses; and
    configuring the master device to control the de-multiplexer to select one of the different data buses associated with a respective one of the different slave devices depending upon which slave device is desired to be communicated with.

11. A microcontroller including:
    a master device including a data line and clock line and being configured to produce a select signal output for enabling data transmission on the data line to first and second different data buses of the microcontroller that support one or more slave devices, each slave device configured to receive/transmit data over a respective data bus and to receive a clock signal from the master device from the clock line;
    a de-multiplexer including an input and first and second outputs and a control input, the input being coupled to an output of the data line of the master device, a first output of the de-multiplexer being coupled to the first data bus and a second output of the de-multiplexer being coupled to the second data bus, and wherein the control input is configured to receive the select signal from the master device; and
    logic coupling the master device, the de-multiplexer and output pads of the microcontroller that correspond to the first and second data buses;
    wherein the master device is configured to communicate to a first slave device coupled to the first data bus when the select signal is in a first state, and to communicate to a second different slave device coupled to the second data bus when the select signal is in a second different state.

12. The microcontroller of claim 11 wherein the logic includes:
    a first buffer coupling the first output of the de-multiplexer to a first pad associated with the first data bus of the microcontroller;
    a second buffer coupling the second output of the de-multiplexer to a second pad associated with the second data bus of the microcontroller;
    an AND gate having first and second inputs and an output coupled to an input of the data line of the master device;
    a third buffer coupling the first pad of the microcontroller to the first input of the AND gate; and
    a fourth buffer coupling the second pad of the microcontroller to the second input of the AND gate.

* * * * *